United States Patent
Mayer et al.

(10) Patent No.: US 7,114,601 B2
(45) Date of Patent: Oct. 3, 2006

(54) TORQUE TRANSFER LIMITING ARRANGEMENT FOR A ROTATIONAL DRIVE SHAFT

(75) Inventors: Edward Mayer, West Orange, NJ (US); Arthur Degenholtz, Teaneck, NJ (US); Naresh P. Vaghela, Bristol (GB)

(73) Assignee: Curtiss-Wright Controls, Inc., Gastonia, NC (US)

( * ) Notice: Subject to any disclaimer, the term of this patent is extended or adjusted under 35 U.S.C. 154(b) by 0 days.

(21) Appl. No.: 10/413,243

(22) Filed: Apr. 14, 2003

(65) Prior Publication Data

US 2004/0200677 A1   Oct. 14, 2004

(51) Int. Cl.
B60T 7/12 (2006.01)
(52) U.S. Cl. .................. 188/134; 188/181 T; 188/163; 244/99.9
(58) Field of Classification Search ............... 188/134, 188/158, 163, 181 T, 71.5, 72.7; 192/223, 192/226, 120; 244/75 R, 99.9
See application file for complete search history.

(56) References Cited

U.S. PATENT DOCUMENTS

| | | | | |
|---|---|---|---|---|
| 4,276,758 A | * | 7/1981 | Coman et al. ................ 464/23 |
| 4,971,267 A | * | 11/1990 | Fulton et al. ............. 244/75 R |
| 4,990,122 A | * | 2/1991 | Grimm ........................ 464/23 |
| 5,082,208 A | * | 1/1992 | Matich ......................... 244/78 |
| 5,353,901 A | * | 10/1994 | Jacques et al. .......... 192/223.3 |
| 5,441,131 A | | 8/1995 | Mayer et al. |
| 5,754,967 A | * | 5/1998 | Inoue et al. .................. 701/54 |
| 5,785,158 A | * | 7/1998 | Grimm ................... 188/181 T |
| 5,901,817 A | | 5/1999 | Gitnes |
| 6,224,017 B1 | * | 5/2001 | Fischer et al. ............ 244/75 R |
| 2002/0030138 A1 | * | 3/2002 | Serven ...................... 244/75 R |
| 2003/0127569 A1 | * | 7/2003 | Bacon et al. ................ 244/195 |

* cited by examiner

*Primary Examiner*—Robert A. Siconolfi
*Assistant Examiner*—Bradley King
(74) *Attorney, Agent, or Firm*—Pearne & Gordon LLP

(57) ABSTRACT

A torque transfer limiting arrangement for a rotational drive shaft. The arrangement includes a torque sensing device for sensing torque within the drive shaft and outputting a signal indicative of the sensed torque. A braking device of the arrangement is actuatable for stopping the drive shaft from rotating. The arrangement also includes a portion for electrically causing operation of the braking device responsive to the signal indicative of the sensed torque above a predetermined value. In one example, the portion for electrically causing operation of the braking device includes a processor. In one example, the rotational drive shaft is part of an aircraft flap actuator system.

11 Claims, 3 Drawing Sheets

TORQUE TRANSFER LIMITING ARRANGEMENT FOR A ROTATIONAL DRIVE SHAFT

FIELD OF THE INVENTION

The present invention relates to an arrangement that limits torque transmitted by a rotational drive shaft. Further, the present invention relates to an arrangement that limits torque transmission by a rotational drive shaft within a system, such as an aircraft flight control system. The present invention is well adapted for use with aircraft leading/trailing edge drive systems.

BACKGROUND OF THE INVENTION

In one known leading/trailing edge drive system a torque limiting device is used to protect an actuator and associated structure from a full stall/dynamic torque applied by power drive source. Other known systems also include torque limiting devices. There exist several types of such known torque limiting devices. Examples of such types of known systems include spring-wrap brakes, multi-disk brakes, and shear-outs. Also, a known leading/trailing edge drive system includes an antiback-up device, often referred to as a no-back, which prevents reverse motion in the event of a shaft failure.

Turning to some specifics of the known devices, the spring-wrap brake device relies on a spring expanding into a housing to absorb the torque. Viscous drag is very high in the spring-wrap brake device. Within the multi-disk brake torque limiting device, several disks are pressed against each other via the use of a ball and ramp configuration or the like. In order to avoid issues concerning freeze-up, lubrication is provided to the disk brake pack. However, such lubrication may cause considerable viscous drag. Such viscous drag is not problematic so as long as the drag is accurately predicted and accounted within a torque brake setting, etc. However, the drag causes inefficiency in the system and higher limit loads on components downstream of the torque brake. With regard to shear-outs, replacement is needed subsequent to the shearing. All of the known devices are actuated via mechanical arrangement or connection. Also, most of the known mechanical systems include the use of an associated antiback-up (i.e., no-back) device.

In general, torque limiting devices must operate in severe environments including wide extremes of temperature, altitude, and weather. In addition, torque limiting devices are often used on high performance aircraft where severe vibration also occurs. Aircraft operating in such conditions put high demand loads on the control surfaces and subsequently, the associated actuation system. Accordingly, the need for torque limiting devices is readily apparent.

It is desirable to have a torque limiting device that operates reliably and swiftly. It is desirable to have a torque limiting device that eliminates the need for a no-back device. Also, it is desirable to prevent inadvertent lock-outs due to inertia or load spikes. In addition, it is desirable to have a torque limiting device that includes a reduced sensitivity range and reduces the occurrence of low temperature breakout torque penalties. It is also desirable that the size of the actuators used be reduced.

SUMMARY OF THE INVENTION

In accordance with one aspect, the present invention provides a torque transfer limiting arrangement for a rotational drive shaft. The arrangement includes torque sensing means for sensing torque within the drive shaft and outputing a signal indicative of the sensed torque. Braking means of the arrangement is actuatable for stopping the drive shaft from rotating. The arrangement also includes means for electrically causing operation of the braking means responsive to the signal indicative of the sensed torque above a predetermined value.

In accordance with another aspect, the present invention provides a torque transfer limiting arrangement for a rotational drive shaft. Braking means of the arrangement is actuatable for stopping the drive shaft from rotating. Actuation means of the arrangement is responsive to a control signal to cause actuation of the braking means. The arrangement includes torque sensing means for sensing torque within the drive shaft and outputing a signal indicative of the sensed torque. The arrangement includes processor means, operatively connected to receive the signal indicative of the sensed torque from the torque sensing means and to provide the control signal to the actuation means, for processing the signal indicative of the sensed torque and determining the need to actuate the braking means.

In accordance with another aspect, the present invention provides a torque limiter and locking arrangement for a rotational drive shaft of an aircraft flap actuator system, wherein rotation of the drive shaft applies force to an aircraft flap. Torque sensing means of the arrangement senses torque within the drive shaft and outputs an electrical signal indicative of the sensed torque. Braking means of the arrangement is actuatable for stopping the drive shaft from rotating and limiting force applied to the aircraft flap. The arrangement includes means for causing operation of the braking means processor means responsive to the electrical signal indicative of the sensed torque.

In accordance with yet another aspect, the present invention provides a computer-controlled torque limiting arrangement. A housing has a rotatable main shaft running axially there through. A torque measuring mechanism, includes a torsion shaft which is provided as a section of the main shaft and position sensors which measure the twist of the torsion shaft. A braking mechanism is contained within the housing. The braking mechanism has a plurality of rotatable brake disks disposed about the main shaft, a plurality of fixed brake disks disposed about the main shaft, and rotatable brake plate means disposed about the main shaft. The rotatable brake disks are coupled to the main shaft, and the plurality of rotatable brake disks are spline coupled to the brake plate means. An electric trip mechanism has a solenoid activated electric clutch responsive to an electrical trigger signal that allows a suitable drive train to convert rotational motion of the main shaft into translational motion of the trigger sleeve. A control computer processes input criteria and sends output signals based on the input criteria. The output signals will allow the control computer to activate the electrical trip mechanism, which releases the locking mechanism. This in turn releases the brake mechanism, wherein the brake mechanism stops the rotatable main shaft from rotating.

BRIEF DESCRIPTION OF THE DRAWINGS

Further features and advantages of the present invention will become apparent to those skilled in the art to which the present invention relates from reading the following description with reference to the accompanying drawings, in which.

DESCRIPTION OF AN EXAMPLE EMBODIMENT

Figure 1:
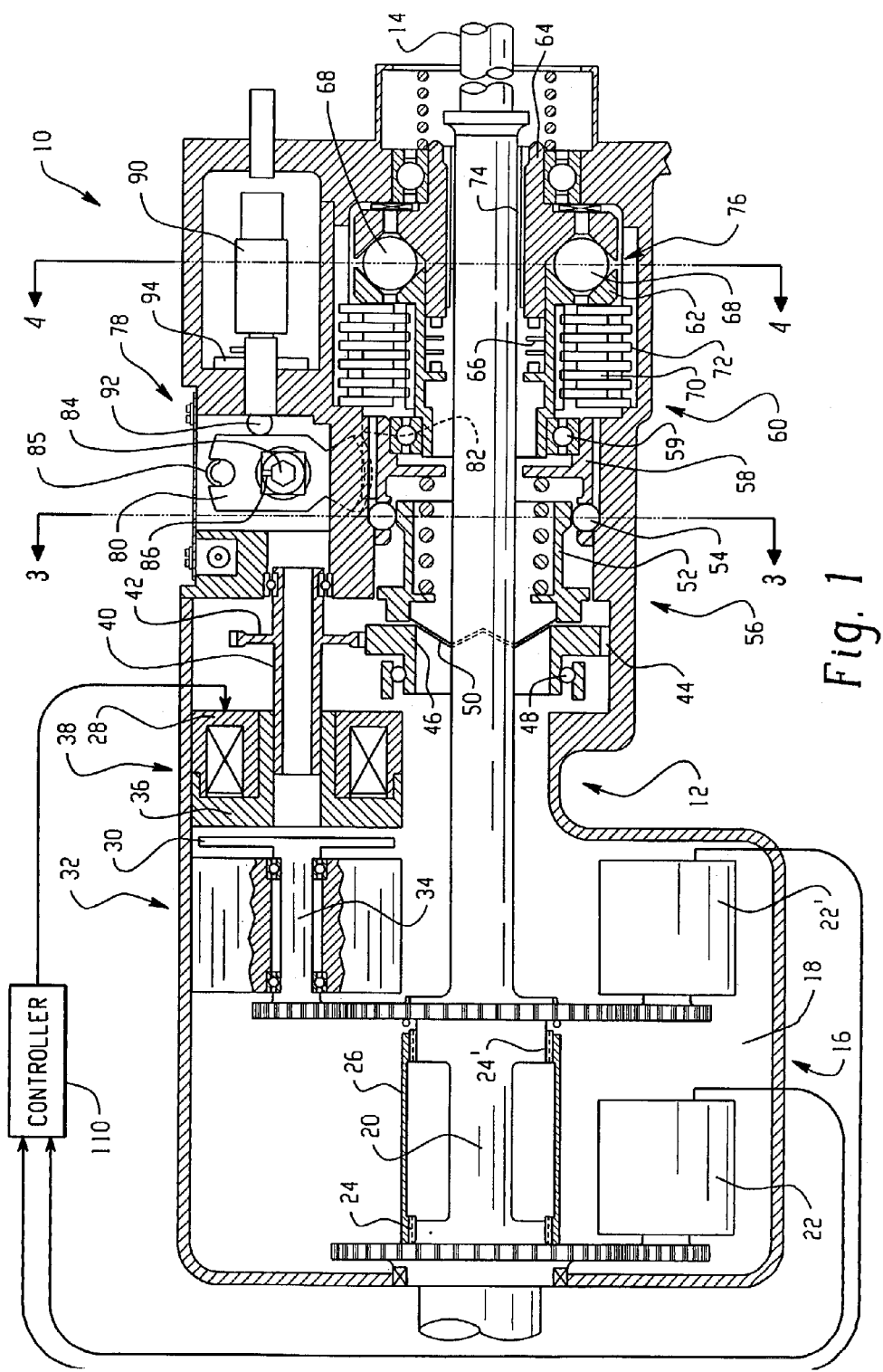
FIG. 1 is a partial cross section view of components of an example torque transfer limiting arrangement according to the present invention with an associated drive shaft.
Figure 2:
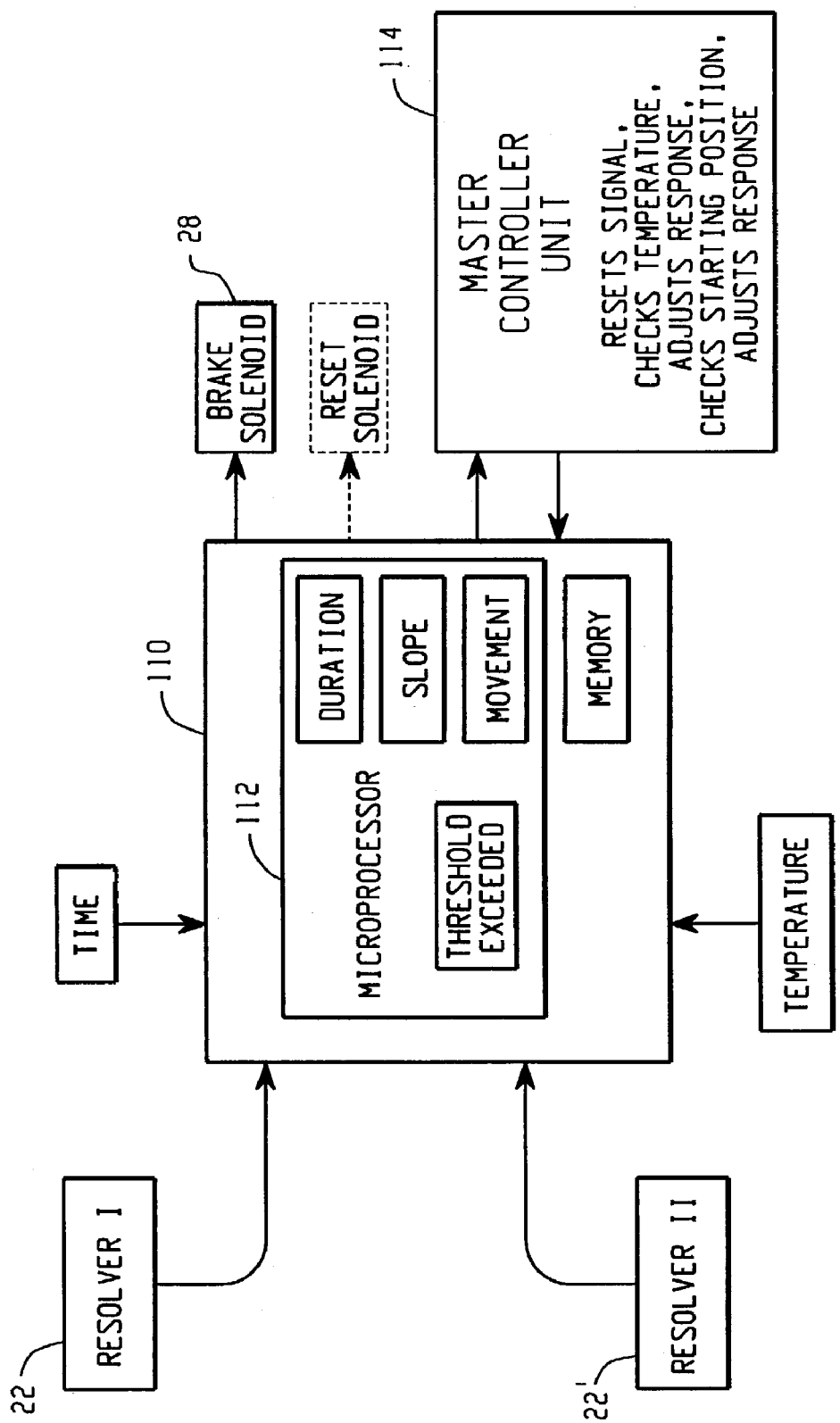
FIG. 2 is a block diagram of electrical components of the example torque transfer limiting arrangement according to the present invention.

An example torque transfer limiting arrangement 10, in accordance with the present invention, and an associated main shaft 14 are shown in FIG. 1. The torque transfer limiting arrangement 10 provides precise limit control of transferred torque via a controller 110 in cooperation with a mechanical arrangement 12. In one example, the controller 110 is an electronic device and can be considered to provide computer control of the torque transfer limitation. FIG. 2 illustrates one example of the electrical/electronic components associated with the provision of the computer control. It is to be noted that, in addition to providing computer control, the torque transfer limiting arrangement 10 (FIG. 1) in accordance with the present invention provides an ability to eliminate the use of an antiback-up (i.e., no-back) device (not shown) and an ability to prevent inadvertent lock-outs due to inertia, load spikes, etc.

Turning to the shown example of the mechanical arrangement 12, it is to be appreciated that the use and construction of the shown mechanical arrangement is not a limitation of the present invention, and that many other mechanical constructions may be utilized without departing from the present invention. Other examples include a centrifugal-type arrangement. For example, the mechanical construction disclosed with U.S. Pat. No. 5,901,817 may be utilized within the present invention. With this understanding, the details of the shown example are described.

The shown mechanical arrangement 12 (FIG. 1) provides for a multi-section housing device that encloses torque sensory components, braking components, braking activation components, and braking release components. The main shaft 14 extends axially through the housing and through some of the enclosed components.

A torque measuring mechanism 16 is contained within a section 18 of the arrangement housing, and measures torque applied to the main shaft 14. Specifically, the torque is measured via monitoring of torsional elastic deformation of a reduced-thickness section 20 of the main shaft 14. The torque measuring mechanism 16 includes two angular position resolvers 22 and 22' secured within the housing section 18. In one example, the resolvers 22, 22' are TRIPLEX-type resolvers. Each resolver (e.g., 22) is connected (e.g., via intermeshing rotational components such as gear teeth wheels) to receive a rotational force from the main shaft 14 on a respective side of the reduced-thickness section 20.

In general, resolvers are a reliable component available to monitor torque that causes elastic shaft deformation. They are suited to hostile environments and their performance does not typically deteriorate with time. They may be placed a distance away from the system electronics package with a minimum of interconnect wiring. Resolvers offer infinite repeatability, provide absolute nonvolatile outputs, and have a high degree of flexibility which simplifies matching them to converter electronics. However, it is to be appreciated that other devices may be used to accomplish torque monitoring. One example of such other devices is a Rayleigh Wave transducers. Still other examples include Hall effect type sensors and acoustic type sensors.

Turning attention again to FIG. 1, portions 24, 24' of the main shaft 14, adjacent to both ends of the reduced-thickness section 20 and at the outer periphery of the shaft, are splined. Projections of the splined portions 24, 24' extend radially outward, and spline gaps of, for example, 0.005 of an inch, are located between the projections. A splined sleeve 26, having radially inwardly extending projections, extends around the main shaft 14 at the reduced-thickness section 20 and the splined portions 24, 24'. The inwardly extending projections of the sleeve 26 are inter-spaced with the outwardly extending projections of the two splined portions 24, 24'. Some amount of free play exists between the sleeve 26 and at least one of the splined portions 24, 24'. Thus, the two splined portions 24, 24' can rotate relative to each other as the reduced-thickness section 20 torsionally deforms. After some amount of relative rotation of the splined portions 24, 24', the sleeve 26 drivingly engages the splined portions 24, 24' such that torque is transmitted through the sleeve and any further torsional elastic deformation of a reduced-thickness section 20 is prevented. The transmission of torque through the sleeve 26 thus provides for a by-pass of the reduced-thickness section 20 such that the reduced-thickness section is not overly deformed and damaged by a heavy torsional load.

The spline interconnection (i.e., the inwardly extending projections on the splined sleeve 26 and the outwardly extending projections of the two splined portions 24, 24') may be rotationally symmetrical such that torsional deflection limitation is the same in each direction (i.e., clockwise and counterclockwise rotation). The main shaft 20, with the reduced thickness section 20, is checked, adjusted, or systematically standardized once installed in the mechanical arrangement 12 to assure that the proper torsional deformation is measured by the resolvers 22, 22' during operation.

It is to be noted that in one example the spacing between intermeshing splines (i.e., between each splined portion 24, 24' and the sleeve 26) is different at each splined portion. Thus, the splines on the sleeve 26 will engage the splines at one of the splined portions (e.g., the left splined portion 24 portion as shown in FIG. 1) prior to the engagement of splines at the other splined portion (e.g., 24'). Such a configuration is merely utilized to provide for a permitted range of torsional elastic deformation of the reduced-thickness section 20 and is not a limitation of the present invention.

The torque measuring mechanism 16 is operatively connected to the controller 110. Signals indicative of the sensed torque are provided to the controller 110. The torque-indicative signals are utilized to determine when a threshold level of torque is achieved. The threshold level is associated with a condition in which the arrangement 10 provides the function of limiting the torque transmitted by the main shaft 14. Control of the limiting function is via the controller 110. The process performed within the controller 110 is discussed in greater detail below.

Turning back to the example structure of the mechanical arrangement 12, the controller 110 is operatively connected to a solenoid 28 of a drive train 32. The determination based upon the torque level (e.g., threshold exceeded) is used to control activation of the solenoid 28. Activation of the solenoid 28 causes transfer of rotational force from normally rotating disk 30 to shaft 40 and shaft 40 begins to rotate. The solenoid 28 and the disk 30 thus provide an electrically-activated clutch 38, which can be referred to as an electric trip mechanism.

In the example of FIG. 1, the drive train 32 includes an input shaft 34 that is positioned parallel to the main shaft 14, and that is supported (e.g., via housed bearings) for rotation within the mechanical housing arrangement. The input shaft 34 is operatively connected to the main shaft 14 (e.g., via intermeshing rotational components such as gear teeth wheels) to cause rotation of the input shaft upon rotation of the main shaft. The input shaft 34 is affixed to the disk 30. Thus, rotation of the input shaft 34 causes rotation of the input shaft 34 and the disk 30.

The solenoid 28 includes a member 36 that is supported for translation movement (i.e., along the axis of the solenoid) in response to electrical activation of the solenoid. The member 36 is also supported for rotation movement within the solenoid 28. The member 36 has a face plate portion, at one end of the solenoid 28, that is engagable with the disk 30, and a cylinder shaft portion that extends to a second end of the solenoid. When the member 36 engages the rotating disk 30, the member 36 is rotated. The cylinder shaft portion has rotational drive surfaces (e.g., spline or gear teeth) that mesh with corresponding surfaces of an output clutch shaft 40. Thus, rotation of the member 36 causes rotation of the output clutch shaft 40. It is to be noted that the member 36 may move axially (i.e., the translation movement in response to electrical activation) relative to the output clutch shaft 40 without affecting the mutual rotation of the member and the output clutch shaft. The output clutch shaft 40 is fixedly connected to an output gear 42, and as such, the output clutch shaft and the output gear rotate together.

Turning now to operation of the drive train 32, the input shaft 34 and the disk 30 rotate with rotation of the main shaft 14. Prior to solenoid activation, the member 36 of the solenoid 28 is spaced from the disk 30 and the member 36 is not rotated. When the solenoid 28 is activated, the member 36 is moved to engage the rotating disk 30 and the member 36 is thus rotated by the disk. As the member 36 is rotated, as a result of solenoid activation, the output clutch shaft 40 and the connected output gear 42 are rotated. As such drive train 32 provides motive force usable to cause a torque limiting activity as is described below. It is to be appreciated that the torque to move the drive train 32, and eventually rotate the output gear 42 is provided by the main shaft 14. As such, the force to accomplish the torque-limiting is provided by the main shaft 14 itself.

The output gear 42 is geared to an input gear 44 of an input gear/output cam 46. In one example, the gearing ratio is 1.9 to 1. The input gear/output cam 46 is set within the housing of the mechanical arrangement 12 with an integral, full complement, angular contact bearing 48 that is concentric about the main shaft 14. Torque transmitted to the input gear 44 of the input gear/output cam 46 is converted into axial force by an output cam 50 positioned on the input gear/output cam 46. Specifically, the output cam 50 of the input gear/output cam 46 has a cam face that mates with a complementary cam face of a trigger sleeve 52. The trigger sleeve 52 is keyed to the housing of the arrangement 12 to prevent rotation of the trigger sleeve, and the trigger sleeve is displaced axially when the input gear/output cam 46 rotates. Thus, the conversion of force by the output cam 50 causes the axial motion of the trigger sleeve 52.

Figure 3:
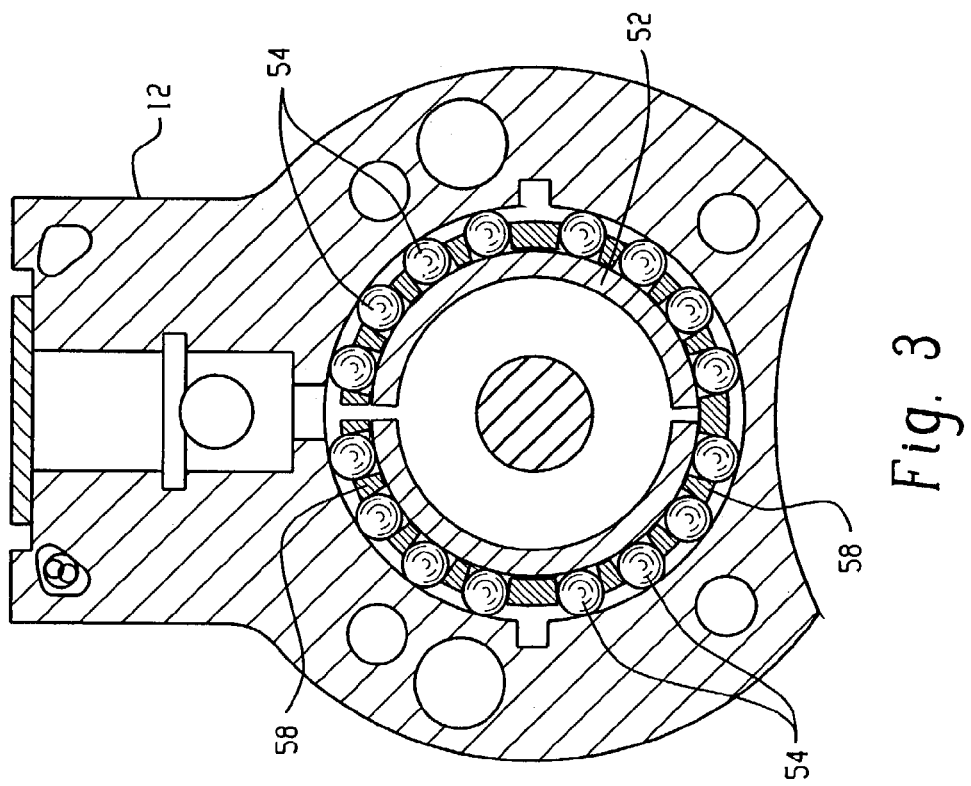
FIG. 3 is a section view taken along line 3—3 on FIG. 1.

The trigger sleeve 52 has a portion that is normally located directly, radially inward of a series of locking balls 54 of a locking mechanism 56 and holds the locking balls at a radially outward position. As will be appreciated from the details shown in the example of FIG. 3, the locking mechanism 56 includes a ball sleeve 58 that is mechanically keyed to the housing of the arrangement 12 so as to prevent rotation of the ball sleeve. The locking balls 54 are configured such that they are trapped in the ball sleeve 58 between a shoulder machined into the housing of the arrangement 12 on the outside and the trigger sleeve 52 on the inside. During the axial motion of the trigger sleeve 52, the portion of the trigger sleeve is shifted laterally to the right as viewed in FIG. 1 relative to the locking balls 54 and permits the locking balls to shift radially inward. When the trigger sleeve 52 is moved away from the ball-retaining position (as show in FIG. 1), the locking balls 54 are freed to drop below the shoulder in the housing of the mechanical arrangement 12 and release the ball sleeve 58 for axial motion. With the release of the locking balls 54 and translation movement of the ball sleeve 58, the brake mechanism 60 is consequently activated.

It should be noted that prior to activation of the brake mechanism 60, the locking mechanism 56 prevents axial motion of an inboard brake plate 62 and holds brake plates 62, 64 in relatively close proximity. The inboard brake plate 62 is connected to the ball sleeve 58 through, for example, a conrad-type ball bearing 59. Axial force is transmitted from the inboard brake plate 62 to the ball sleeve 58 via the bearing 59. Upon release of the locking balls 54, the axial force from the inboard brake plate 62 results in axial motion of the ball sleeve 58. The axial movement of the inboard brake plate 62 and the ball sleeve 58 is associated with the activation of the brake mechanism 60.

As shown in from FIG. 1, the brake mechanism 60 includes a disk brake pack. The disk brake pack of the brake mechanism 60 includes a plurality of rotatable brake disks 70 and an interposed plurality of fixed brake disks 72. The brake disks 70, 72 may be made of a variety of friction materials including metallic alloys and/or nonmetallic composites. Although the brake mechanism 60 operates under dry conditions, it may be lubricated as conditions warrant. The brake mechanism 60 also includes a brake plate wave spring 66 and brake balls 68.

Figure 4:
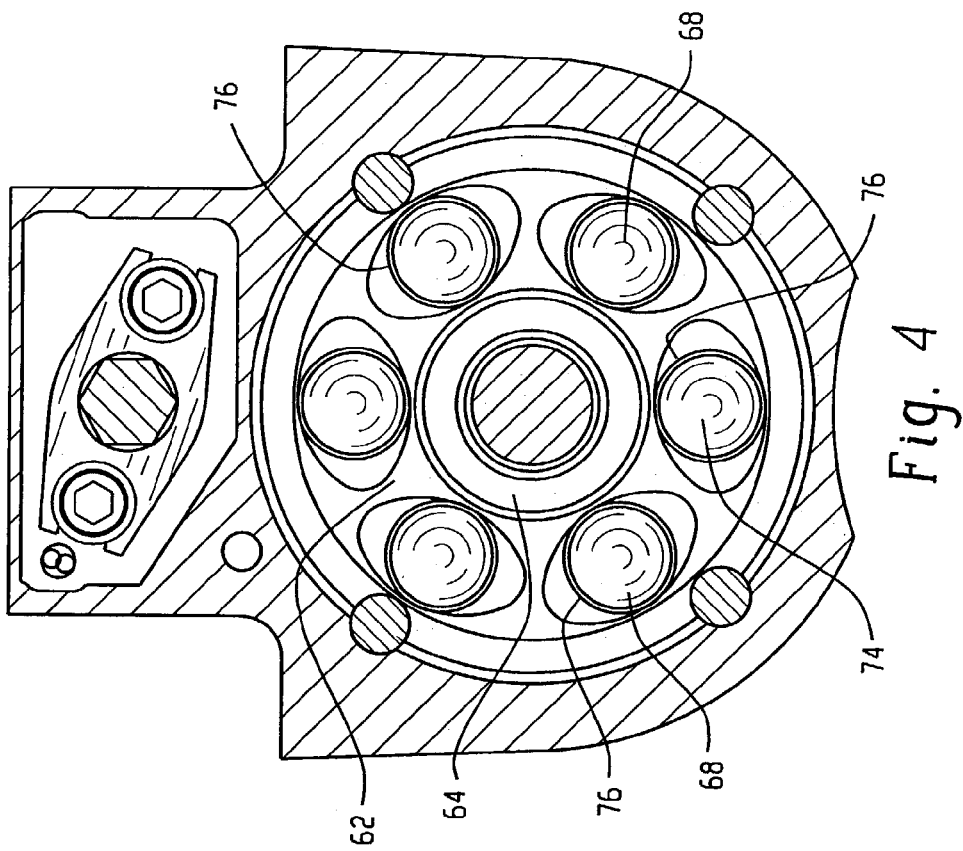
FIG. 4 is a section view taken along line 4—4 on FIG. 1.

The brake mechanism 60 is held in an unlocked position by the locking mechanism 56 until released by a trip command. The locking mechanism 56 keeps the brake mechanism 60 unlocked even when exposed to large acceleration transients by the main shaft 14. Upon release, the rotating inboard and outboard brake ramps 64, 62 are separated by the brake plate wave spring 66 and by the brake balls 68. The outboard brake plate 64 is spline-coupled 74 to the main shaft 14. The brake balls 68 are held in pockets 76 (see FIG. 4) machined into both of the brake plates 62, 64. The brake balls 68 drive the inboard brake plate 62 such that both brake plates 62, 64 rotate together.

The inboard brake plate 62 (FIG. 1) is spline-coupled to the plurality of rotatable brake disks 70, which are intermingled with the corresponding plurality of fixed brake disks 72. In turn, the fixed brake disks 72 are slidably secured to the housing of the mechanical arrangement 12. As the inboard and outboard brake plates 62 and 64 are separated by the ramps formed by the pockets 76, the inboard brake plate 62 applies increasing axial force to the rotatable brake disks 70 which in turn apply increasing axial force against the fixed brake disks 72 until the friction force developed there between exceeds the torque of the main shaft 14 and rotation of the shaft ceases. Since the arrangement is locked by the brake mechanism 60, no-backs are not required as with other torque limiting devices.

It is to be appreciated that the braking function may be accomplished by another structure, such as a toothed brake mechanism (not shown). One example of a toothed brake mechanism is shown in U.S. Pat. No. 5,901,817.

An advantageous feature of the structure described above is that the structure provides what may be portrayed as three stage mechanical amplification, resulting in what may be characterized as very rapid sequencing and enactment stages that provide for a rapid response. The first stage occurs when the clutch 38 and its accompanying structure allows the input gear 44 to connect to the output cam 50 in a rapid manner. A high input torque is provided by the main shaft 14 through input shaft 34 to the clutch 38. In the second stage, once connected, the output cam 50 moves trigger sleeve 52 rapidly to release locking balls 54. In the third stage, brake plates 62, 64 cause compression of the brake disks 70, 72.

This rapid response makes the structure compatible for use with rapid response signals that are provided by the controller 110 described hereinafter or other fast responding electrical control devices. For example, a rapid response signal from an aircraft CPU may be used to energize the clutch 38. Typical operating times for the above-described structure may be as short as 13 milliseconds from signal to shaft stop with the disk brake pack, as illustrated in the example embodiment of FIG. 1.

After a brake trip occurs, the brake mechanism 60 is manually reset. However, it is contemplated that an electrically controlled reset, in cooperation with the electrical control of the braking activation, is possible. This possibility is shown by the phantom portion of FIG. 2. For electrical controlled reset, an electrically controlled solenoid may be employed.

Turning to mechanical reset, a reset mechanism 78 is provided within the housing of the mechanical arrangement 12. The reset mechanism includes a sector gear 80 that is geared directly to a rack 82 on the ball sleeve 58. The sector gear 80 is coupled to the reset shaft 84, via a retaining clip 85, which protrudes out of the housing of the arrangement 12. The reset shaft 84 may be turned by a standard hex key wrench and is machined with an indicator mark 86 to verify that the brake mechanism 60 is reset. The components of the reset mechanism 78 are designed of high strength materials so that if the mechanism 78 is over-torqued, the hex key wrench will break before the components.

A trip indication switch 90 is actuatable to indicate that the brake mechanism 60 has been engaged. The trip indication switch 90, which is typically a MIL-S-8805 qualified travel limit switch, has a plunger 92 for activation and is hermetically sealed. The trip indication switch 90 is mounted to a threaded plate 94 and the threaded plate 94 is bolted to the housing of the mechanical arrangement 12. Prior to brake activation, the plunger 92 is in contact with the sector gear 80 and the trip indication switch 90 is in an open position. Rotation of the sector gear 80 during a brake activation (i.e., trip) forces the plunger 92 to close the trip indication switch 90 and hold it closed until reset.

With attention now to FIG. 2, an example of the electrical control in accordance with the present invention is now discussed. The controller 110 includes a microprocessor 112. In one example, the microprocessor 112 is a central processing unit or CPU of a microcomputer. Further in the example, the microprocessor 112 contains an arithmetic logic unit and control units. The microprocessor may be implemented on a single LSI chip. The microprocessor 112 is connected to a memory, inputs/outputs (I/O's), etc. via buses.

Determinations are performed by the microprocessor 112 of the controller 110, and the determinations may take several forms. In a basic form of determination, the amount of torque is determined, and the determined value is compared to a preset threshold value. If it is determined that the threshold is exceeded, the controller 110 outputs the solenoid-activating signal. Along these lines it is contemplated that the relationship of a repeatable input shaft position vs. output torque may be evaluated beginning from a no load condition. Breakout torque may be monitored in a similar manner. Gear and spline backlash may also be monitored, and may be used to establish lock out criteria. As such it is to be appreciated that many different, additional processes and determinations are possible and contemplated.

The use of electrical-based sensing, as opposed to mechanical sensing of the prior art, and the electrical-based determination to limit torque transmission, as opposed to a purely mechanical activation, results in a swifter and more reliable torque limiting function. The use of electrical control (electronic control in the specific example) in accordance with the present invention, results in the advantages of speed and reliability without a need for relatively high-weight. The operation is targetable to a small range of operation, and high reliability and repeatability of torque transmission limiting is achieved.

As mentioned, the microprocessor 112 processes the torque-indicative signals (i.e., I/O signals) and makes at least one, and possibly more, determination(s) regarding torque. Specifically, the microprocessor determines if the threshold is exceeded. It is contemplated that other I/O signals could be provided to the microprocessor 112 and utilized therein.

For example, time information which is defined as a nonspatial continuum in which events occur in apparently irreversible succession from the past, through the present, to the future, may be inputted to the microprocessor 112. Utilizing time information, timing of events could be monitored. For example, time could be utilized to monitor the very rapid sequencing and enactment stages.

Along these lines, duration, defined as the period of time during which something exists or persists, may be monitored. For example, in the case of transient load spikes, the microprocessor may observe the duration of the spike such that these spikes meet defined criteria, and the spikes could be acted upon or ignored dependant on that criteria.

The controller 110 may employ a spring-time delay in outputting the solenoid activating signal. Its operation can be tailored to eliminate inadvertent lockouts from spikes, and tailored to reduce actuator operating ranges due to low temperatures and system operation.

Temperature is another possible input. Temperature is defined as a scalar quantity or range. The microprocessor 112 could check temperature response accordingly. In addition, for example, adjustments for start transient temperatures are possible. Operation and breakout at what could be demarcated as low temperature, for example minus 65° F., could also be monitored and adjustment provided therefor.

It is to be noted that a number of computer control approaches may be used in conjunction the controller 110. In one example, a separate controller 110 may be associated with each shaft 14 for which torque transfer is to be limited. In another example, the controller 110 may be associated with, and provide control for, plural shafts 14 for which torque transfer is to be limited (e.g., all the torque shafts on an aircraft wing). In yet another example, controller 110 is incorporated into a larger system that contains an overall or master controller 114 (as shown in FIG. 2).

In addition to providing control signals to one or more controllers 110 from the master controller 114, the master controller could be utilized to perform data acquisition, processing, signaling, etc. For example, within an overall, integrated system, the master controller 114 may be programmed to inform a pilot, based upon monitored information derived from the controller 110, to deploy the flaps earlier when conditions for deployment are favorable. Also, in addition to the output signal sent to the solenoid 28, a corresponding signal may be sent to the master controller 114. The signal is usable for notification, recording, etc.

Various programs could be performed for data acquisition, on-line analysis, or even simulation. With regard to simulation, an interface with a computer allows a technician to run computer-based programs (e.g., a DOS program written in Watcom C that runs using Windows) that interact with the controller 110. Such a computer program could utilize Menus and Dialog boxes that can be activated by keyboard input.

On- and off-line monitoring, calculation, plotting, etc. may include: DC baseline, peak amplitude, peak latency, slope, integration area, event duration, 10–90% rise time, 10–90% decay time, coastline, spike amplitude, spike latency, etc.

Slope, defined as the rate at which an ordinate of a point of a line on a coordinate plane changes with respect to a change in its abscissa, may be monitored and used for a number of features. For example, in the case of transient load spikes, the microprocessor 112 may observe the slope of the spike such that transient load spikes meet defined criteria and the spikes could be acted upon or ignored dependant on that criteria.

Movement, defined as a tendency or trend, of a value may be monitored and utilized. For example, in the case of transient load spikes, the microprocessor 112 may observe the movement of the spike such that transient load spikes meet defined criteria and the spikes could be acted upon or ignored dependant on that criteria. Many additional types of movement calculations may be provided.

From the above description of the invention, those skilled in the art will perceive improvements, changes and modifications. Such improvements, changes and modifications within the skill of the art are intended to be covered by the appended claims.

Having described the invention, the following is claimed:

1. A torque transfer limiting arrangement for a single rotational drive shaft, the arrangement including:
    torque sensing means for sensing torque within the single unitary drive shaft and outputting a signal indicative of the sensed torque;
    braking means actuatable for stopping the drive shaft from rotating; and
    means for electrically causing operation of the braking means responsive to the signal indicative of the sensed torque above a predetermined value;
    wherein the rotational drive shaft is part of an aircraft flap actuator system, and wherein the torque measuring means includes two angular position resolvers positioned at two separate locations on the drive shaft.

2. An arrangement as set forth in claim 1, wherein the drive shaft includes a portion that provides a torsion shaft, one end of the torsion shaft being rotatable relative to another end of the torsion shaft in response to applied torque, each resolver being located at a respective end of the torsion shaft.

3. A torque transfer limiting arrangement for a single rotational drive shaft of an aircraft flap actuator system, wherein rotation of the drive shaft applies force to an aircraft flap, the arrangement including:
    braking means actuatable for stopping the single drive shaft from rotating;
    actuation means, responsive to a control signal, to cause actuation of the braking means;
    torque sensing means operational upon only the single drive shaft for sensing torque within the single drive shaft and outputting a signal indicative of the sensed torque within the single drive shaft; and
    processor means, operatively connected to receive the signal indicative of the sensed torque from the torque sensing means and to provide the control signal to the actuation means, for processing the signal indicative of the sensed torque and determining the need to actuate the braking means when the torque within the single drive shaft exceeds a preset threshold level determined by the processor based upon selected parameters, wherein the torque measuring means includes two angular position resolvers positioned at two separate locations on the drive shaft.

4. An arrangement as set forth in claim 3, wherein the drive shaft includes a portion that provides a torsion shaft, one end of the torsion shaft being rotatable relative to another end of the torsion shaft in response to applied torque, each resolver being located at a respective end of the torsion shaft.

5. A computer-controlled torque limiting arrangement including:
    a housing having a rotatable main shaft running axially there through;
    a torque measuring mechanism, including a torsion shaft provided as a section of the main shaft and position sensors for measuring twist of the torsion shaft;
    a braking mechanism contained within the housing, the braking mechanism having a plurality of rotatable brake disks disposed about the main shaft, a plurality of fixed brake disks disposed about the main shaft, and rotatable brake plate means disposed about the main shaft, the rotatable brake disks being coupled to the main shaft, the plurality of rotatable brake disks being spline-coupled to the brake plate means, and the braking mechanism is releasable such that the brake plate means increases frictional engagement between the rotatable brake disks and the fixed brake disks to stop rotation of the main shaft;
    an electric trip mechanism having a solenoid activated electric clutch responsive to an electrical trigger signal that allows a drive train to convert rotational motion of the main shaft into translational motion of a trigger sleeve; and
    a control computer for processing input criteria and for sending output signals based on the input criteria, the output signals will allow the control computer to activate the electrical trip mechanism, which releases a locking mechanism, which in turn actuates the brake mechanism, wherein the brake mechanism stops the rotatable main shaft from rotating.

6. An arrangement as set forth in claim 5, wherein the control computer includes a microprocessor.

7. An arrangement as set forth in claim 5, wherein the brake plate means includes an outboard brake plate, an inboard brake plate, and a plurality of brake balls, wherein the plurality of brake balls are captively disposed between the outboard brake plate and the inboard brake plate, wherein the outboard brake plate is directly coupled to the main shaft, wherein the inboard brake plate is spline-coupled to the plurality of the rotatable brake disks, wherein the inboard brake plate is forcibly biased toward and against a ball retention sleeve by a brake plate spring means, and wherein the outboard brake plate and the inboard brake plate are forcibly opposed by the brake plate spring means.

8. An arrangement as set forth in claim 7, wherein the trigger sleeve has a spring shoulder formed therein, and including a trigger sleeve spring means is disposed against the spring shoulder for biasing the trigger sleeve into a position that holds the brake mechanism against release.

9. An arrangement as set forth in claim 5, wherein the torque measuring mechanism includes a sleeve having multiple sets of splines with free-play on one set of the splines, whereby the splined sleeve will by-pass system torque from the torsion shaft after a specific deflection is reached in the torsion shaft.

10. An arrangement as set forth in claim 8, wherein the inboard brake plate is forcibly biased toward and against the ball retention sleeve by the brake plate spring means through a ball bearing.

11. An arrangement as set forth in claim 5, further including a trip indication mechanism contained within the brake housing for indicating whether brake mechanism has been released to stop rotation of the main shaft.

* * * * *